United States Patent [19]
Bates et al.

[11] Patent Number: 5,377,314
[45] Date of Patent: Dec. 27, 1994

[54] METHOD AND SYSTEM FOR SELECTIVE DISPLAY OF OVERLAPPING GRAPHIC OBJECTS IN A DATA PROCESSING SYSTEM

[75] Inventors: Cary L. Bates, Rochester; Jeffrey M. Ryan; Byron T. Watts, both of Byron, all of Minn.

[73] Assignee: International Business Machines Corporation, Armonk, N.Y.

[21] Appl. No.: 995,227

[22] Filed: Dec. 21, 1992

[51] Int. Cl.$^5$ .............................................. G06F 15/62
[52] U.S. Cl. .................................... 395/135; 395/161
[58] Field of Search ............... 395/135, 157, 158, 159, 395/160, 153, 161; 345/113, 114, 115

[56] References Cited

U.S. PATENT DOCUMENTS

| | | | |
|---|---|---|---|
| 4,559,533 | 12/1985 | Bass et al. | 340/724 |
| 4,649,499 | 3/1987 | Sutton et al. | 395/159 |
| 4,713,656 | 12/1987 | Cliff et al. | 395/157 |
| 4,823,283 | 4/1989 | Diehm et al. | 395/157 |
| 4,868,765 | 9/1989 | Diefendorff | 395/157 |
| 4,984,152 | 1/1991 | Muller | 395/159 |
| 5,046,001 | 9/1991 | Barker et al. | 364/200 |
| 5,075,675 | 12/1991 | Barker et al. | 395/157 |
| 5,129,055 | 7/1992 | Yamazaki et al. | 395/158 |
| 5,191,644 | 3/1993 | Takeda | 395/158 |
| 5,263,159 | 11/1993 | Mitsui | 395/600 |
| 5,317,687 | 5/1994 | Torres | 395/159 |

FOREIGN PATENT DOCUMENTS 2100100A 12/1982 United Kingdom .......... G09G 1/16

OTHER PUBLICATIONS

Goodman, "The Complete Hypercard Handbook," Bantam (1987), pp. 17–63.
"Graphical Indexes Based on Sort", Research Disclosure 31940, p. 878 (Nov. 1990).
Kan et al., "Optimal List Order Under Partial Memory Constraints," Journal of Applied Probability, vol. 17 No. 4, pp. 1004–1015.

Primary Examiner—Heather R. Herndon
Assistant Examiner—N. Kenneth Burraston
Attorney, Agent, or Firm—Steven J. Roth; Andrew J. Dillon

[57] ABSTRACT

A method and system are provided for permitting a user of a data processing system to display particular ones of multiple overlapping graphic objects. A subregion within a display is specified by the user. A set of overlapping graphic objects which are at least partially displayed within the subregion is then determined. The specified display order of only these graphic objects which are at least partially displayed with the specified subregion is temporarily altered, in response to a user input.

14 Claims, 10 Drawing Sheets

METHOD AND SYSTEM FOR SELECTIVE DISPLAY OF OVERLAPPING GRAPHIC OBJECTS IN A DATA PROCESSING SYSTEM

BACKGROUND OF THE INVENTION

1. Technical Field

The present invention relates in general to a method and system for permitting a user to selectively display particular overlapping graphic objects in a data processing system and in particular to a method and system in a data processing system for altering the display of a set of overlapping graphic objects which are displayed at least partially within a subregion of a display. Still more particularly, the present invention relates to a method and system in a data processing system for temporarily altering a specified order of a set of overlapping graphic objects displayed within a designated subregion of a computer display in response to a user input.

2. Description of the Related Art

Graphic objects may be displayed on a computer display screen for use by a user who may then manipulate the objects by storing, deleting, rotating, or filling selected objects. In order to manipulate a graphic object, the user must first select a graphic object. To select a graphic object a user typically positions a mouse pointer or cursor over some visible part of the desired object and then clicks the mouse device or otherwise indicates the selection of an object utilizing keyboard strokes.

In known computer systems multiple graphic objects may be arranged and simultaneously displayed such that portions of some of the graphic objects overlap and obscure portions of other graphic objects. In order to select a graphic object which is completely obscured by other graphic objects, a user must generally rearrange the order in which the objects are displayed so that at least a portion of the desired graphic object appears. Once a portion of the desired graphic object is visible, the user may then utilize a mouse or keyboard to make the selection, as described above.

Some computer systems permit a user to selectively access overlapping objects, such that a partially hidden object appears on top of all other graphic objects and is then completely visible. A user must then request that the selected object revert back to the previous position within the overlapping objects, after completing a utilization of the object. However, for an object to be selected utilizing this type of computer system, at least a portion of a graphic object must be visible. If an object is completely hidden, the user must necessarily rearrange the order of the objects, so that at least a portion of the desired object is visible.

Other systems permit an indication of selected graphic objects not currently displayed within the computer screen by providing a scroll bar with arrows or bars. The arrows or bars are utilized to indicate the number and/or direction of objects which are not currently displayed.

It should therefore be apparent that a need exists for a method and system for permitting a user to selectively display particular overlapped graphic objects without disturbing the specified order of all graphic objects within a display.

SUMMARY OF THE INVENTION

It is therefore one object of the present invention to provide an improved method and system for permitting a user to selectively display particular overlapping graphic objects in a data processing system.

It is another object of the present invention to provide an improved method and system for altering the display of a set of overlapping graphic objects which are displayed at least partially within a subregion of a display within a data processing system.

It is yet another object of the present invention to provide an improved method and system for temporarily altering a specified order of a set of overlapping graphic objects displayed within a designated subregion of a computer display in response to a user input within a data processing system.

The foregoing objects are achieved as is now described. A method and system are provided for permitting a user of a data processing system to display particular ones of multiple overlapping graphic objects. A subregion within a display is specified by the user. A set of overlapping graphic objects which are at least partially displayed within the subregion is then determined. The specified display order of only these graphic objects which are at least partially displayed with the specified subregion is temporarily altered, in response to a user input.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
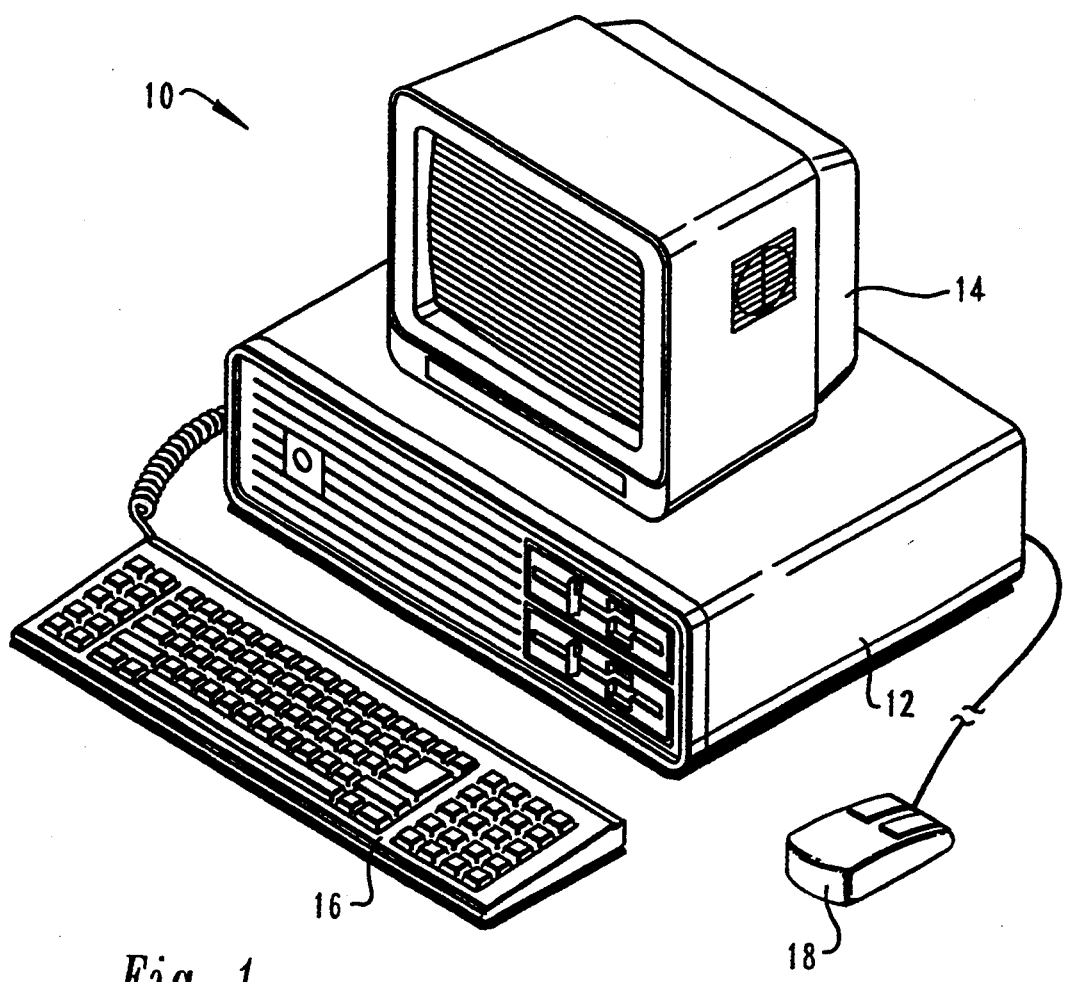
FIG. 1 depicts a pictorial representation of a data processing system which may be utilized to implement the method and system of the present invention.

With reference now to the figures and in particular with reference to FIG. 1, there is depicted a pictorial representation of a data processing system 10 which may be utilized in accordance with the method and system of the present invention. Data processing system 10 preferably includes a processor 12, preferably provided by utilizing an International Business Machines Personal System/2 or similar system. Data processing system 10 generally includes a video display device 14, keyboard 16, and a graphical data entry device such as a mouse 18. Video display device 14 and keyboard 16 may be utilized to allow user input to processor 12 and to provide user discernable messages. In a preferred embodiment of the present invention, processor 12 is suitably programmed to provide the displays depicted in FIGS. 2 through 5 and to implement the processes set forth in the logic flowcharts included herein.

Figure 2:
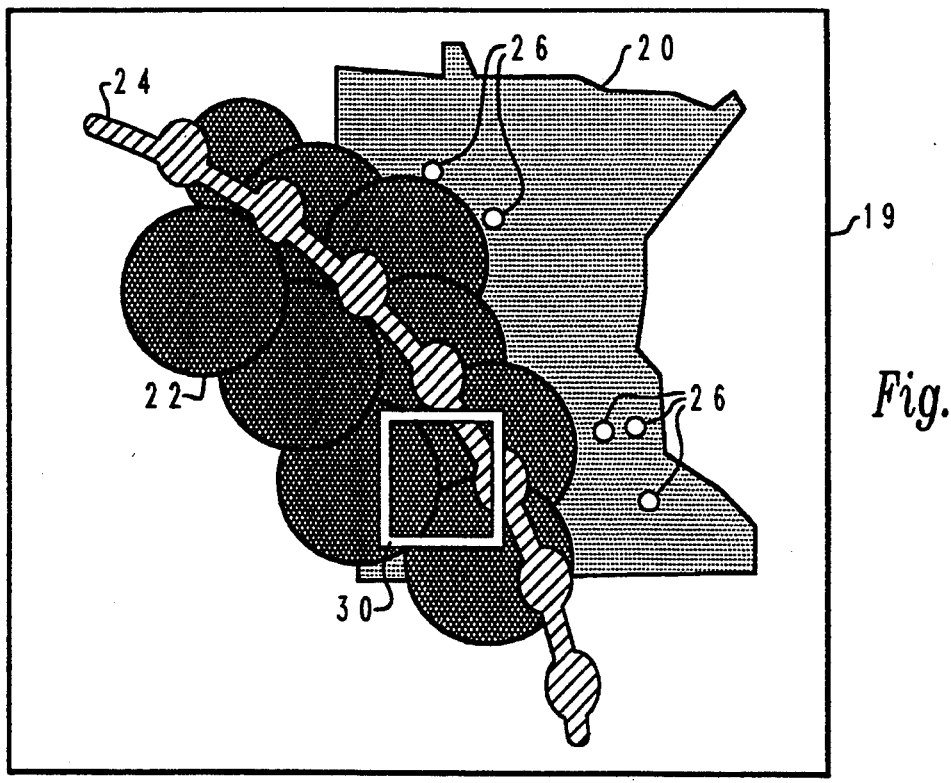
FIGS. 2, 3, 4, and 5 illustrate the alteration of a display order of multiple graphic objects within a specified subregion of a display, in accordance with the present invention.

Referring to FIGS. 2, 3, 4, and 5, there are depicted multiple graphic objects within a subregion of a display screen 19 in accordance with the present invention. Referring now to FIG. 2, multiple graphic objects such as the state of Minnesota 20, clouds 22, a weather front 24, and cities 26 are depicted. As those skilled in the art will appreciate, graphic objects may include lines, text, figures, bitmaps, characters, or user selectable regions. Those skilled in the art should appreciate that the object being manipulated may be an abstract computer object, such as a video object or animation that reads bitmap input or video frames and updates the screen information very rapidly. In addition, objects which look the same on the screen may be differentiated by the sounds they produce. When one of these objects is highlighted, the sound associated with the object may also be highlighted in order to identify the object. When an object is highlighted, the sound that the object emits may also be highlighted by increasing the volume or otherwise changing the sound to differentiate it from other sounds in the system.

As illustrated, certain of the graphic objects overlap. For example, weather front 24 overlaps clouds 22, which in turn overlap state 20. Similarly, cities 26 overlap state 20. In this matter, the graphic objects may be said to overlap in a specified order. Other graphic objects may exist but are completely obscured under a visible graphic object, such as clouds 22. These obscured graphic objects are included within the specified order even though their location within the order is not readily apparent.

A user may desire to select a graphic object which the user believes is completely obscured under a visible graphic object. For example, a user may desire to select a city which is not currently visible. In order to do this, the user first specifies a subregion 30 which covers the expected location of the hidden city. The subregion may be specified by utilizing a marquee selection. Marquee selection is a technique that allows a user to select objects or specify a subregion on a display screen by drawing a rectangle around the objects or subregion utilizing a pointing device. The specified subregion may be a user defined size ranging from a single point to the whole display.

The user may then toggle through all graphic objects, including any hidden graphic objects, which touch or are at least partially displayed within subregion 30 by selectively altering the order of these graphic objects. Each graphic object is then highlighted and made visible to the user. The highlighting may be accomplished in any suitable manner, such as by making the graphic object brighter than the other graphic objects or by drawing the outline of the graphic object. Once the user has viewed a graphic object, the user may select that graphic object or continue toggling through the remaining graphic objects. After a selection has been made, all graphic objects which touch or are at least partially displayed within the selected subregion are returned to their original specified order.

As illustrated by FIG. 2, weather front 24, clouds 22 and state 20 are at least partially within subregion 30 displayed on display screen 19. The user has graphically specified subregion 30 as the expected location for a city hidden by clouds 22.

Figure 3:
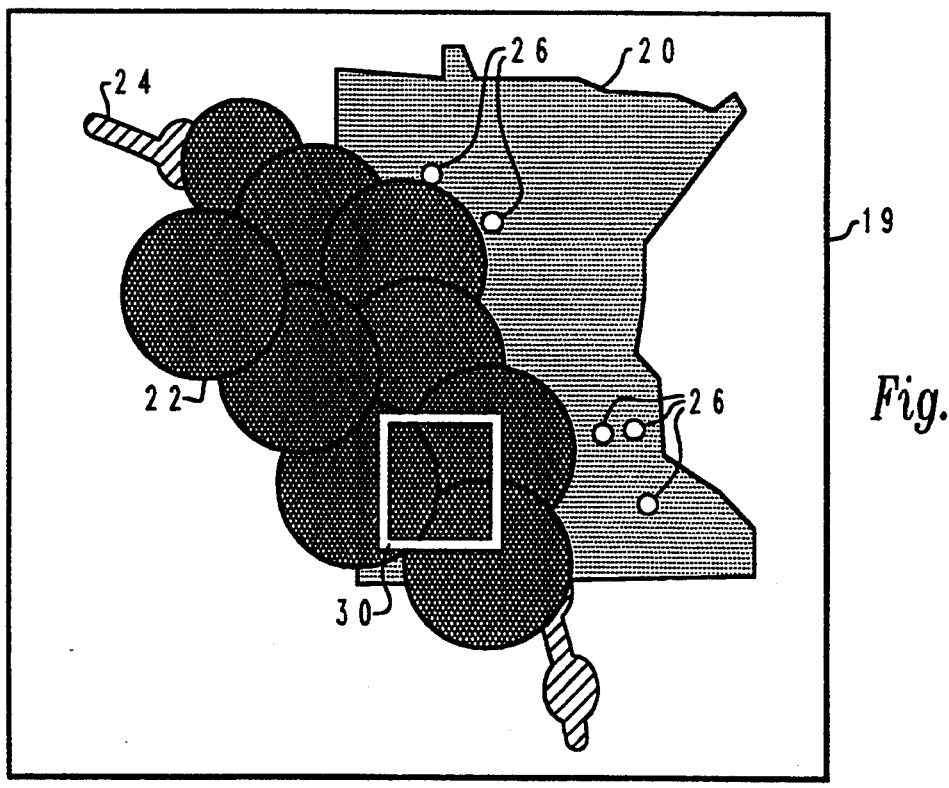

Referring now to FIG. 3, the user may begin to toggle through all graphic objects at least partially within or touching subregion 30 by selectively altering the display order of the graphic objects. Clouds 22 is the first object within subregion 30 to be made completely visible. A user may select clouds 22 or continue to toggle through the other graphic objects by altering the display order.

Figure 4:
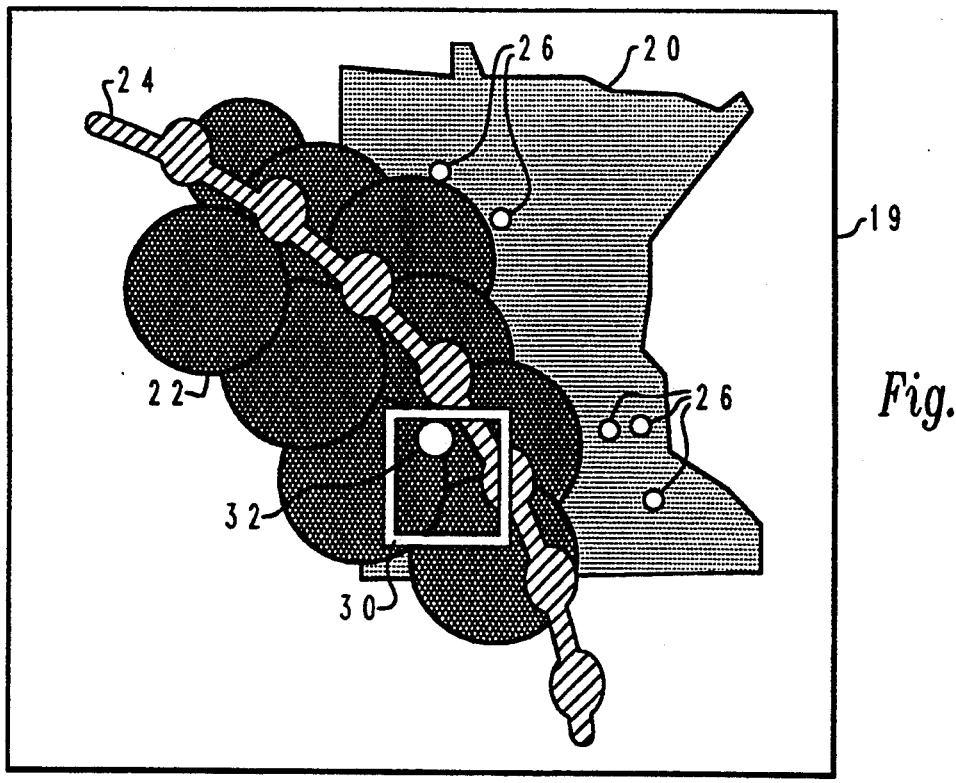
Figure 5:
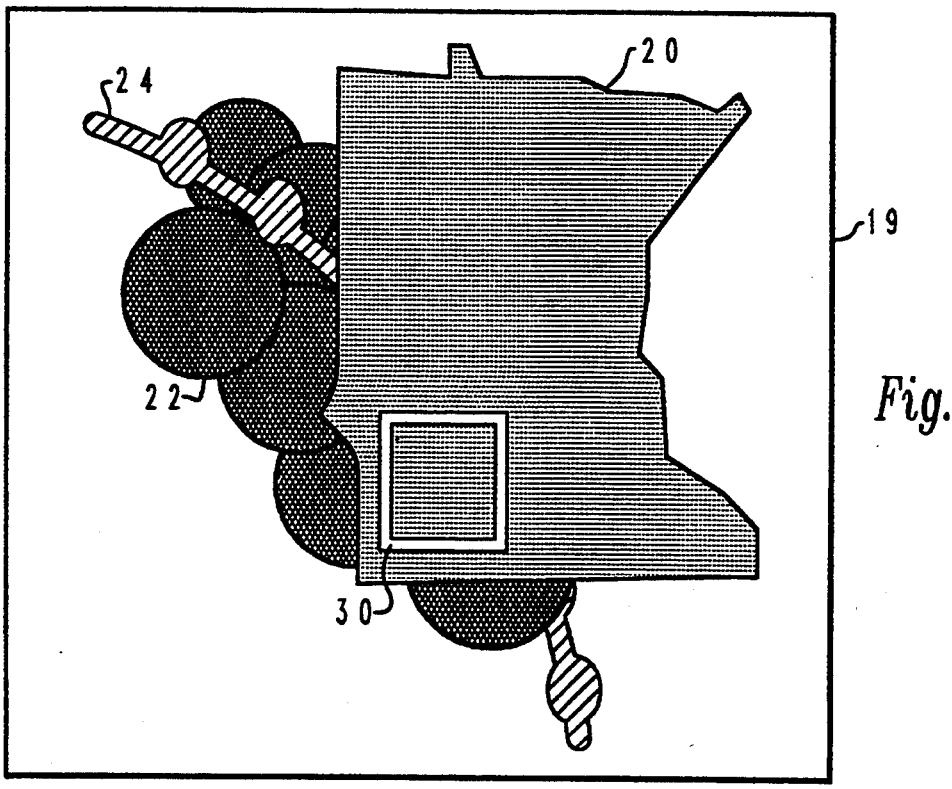

With reference to FIG. 4, if a user has chosen to continue to toggle though all of the other graphic objects, city 32 next appears completely visible. As illustrated above, city 32 was previously obscured by clouds 22. A user may select city 32 or continue to toggle through the graphic objects, altering the display order. FIG. 5 illustrates that if the user continues to toggle through the graphic objects, altering the display order, state 30 would next appear completely visible.

Therefore, FIGS. 2-5 illustrate that there are four graphic objects which touch or are at least partially within subregion 30 displayed on display screen 19 which will appear in the following specified order: weather front 24, clouds 22, city 32 and state 20. If a user specifies a different subregion, then a different set of graphic objects in a different specified order might appear.

Figure 6A:
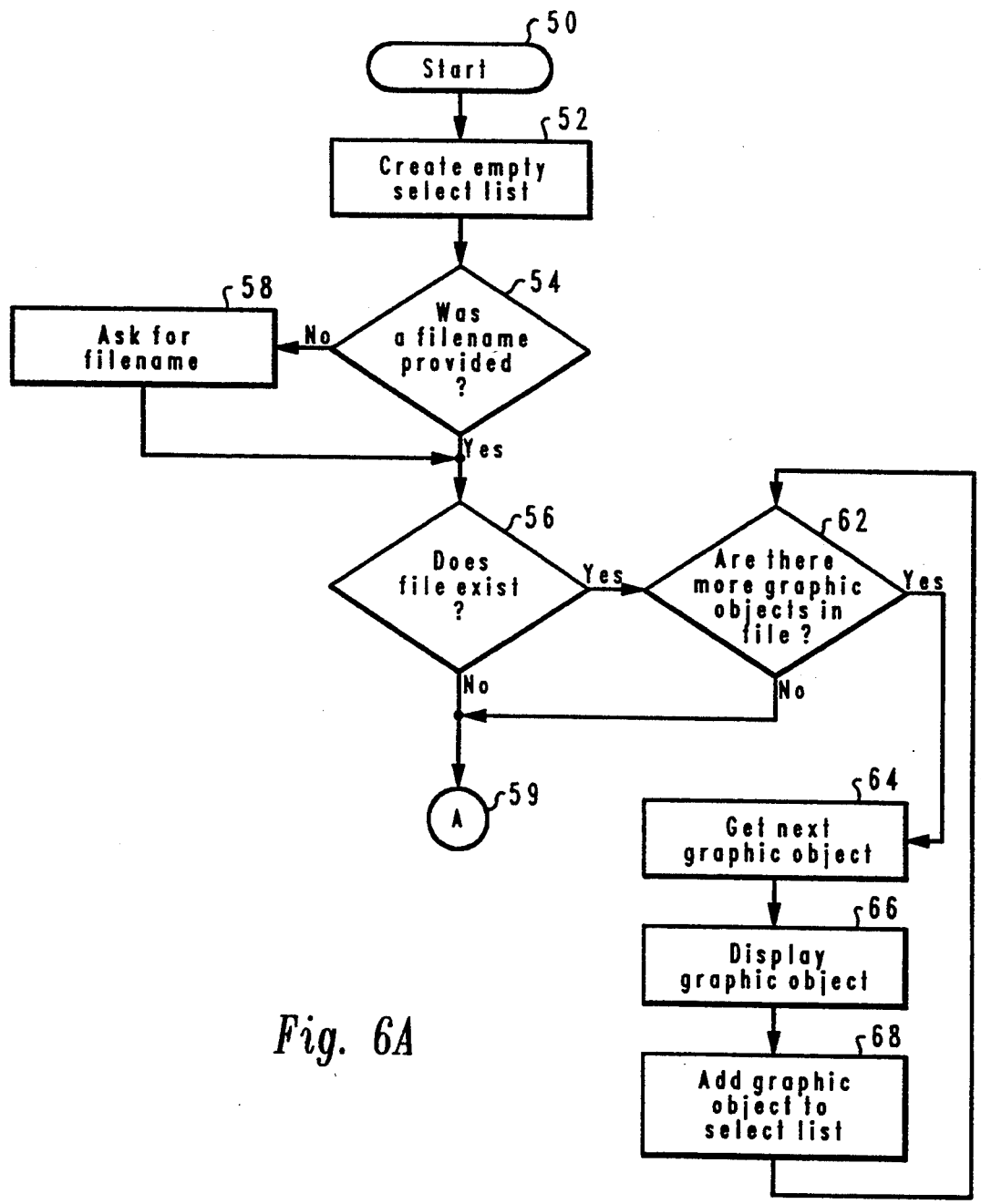
FIGS. 6A and 6B together form a high level flow chart which illustrates editing and creating graphic objects in accordance with the present invention.
Figure 6B:
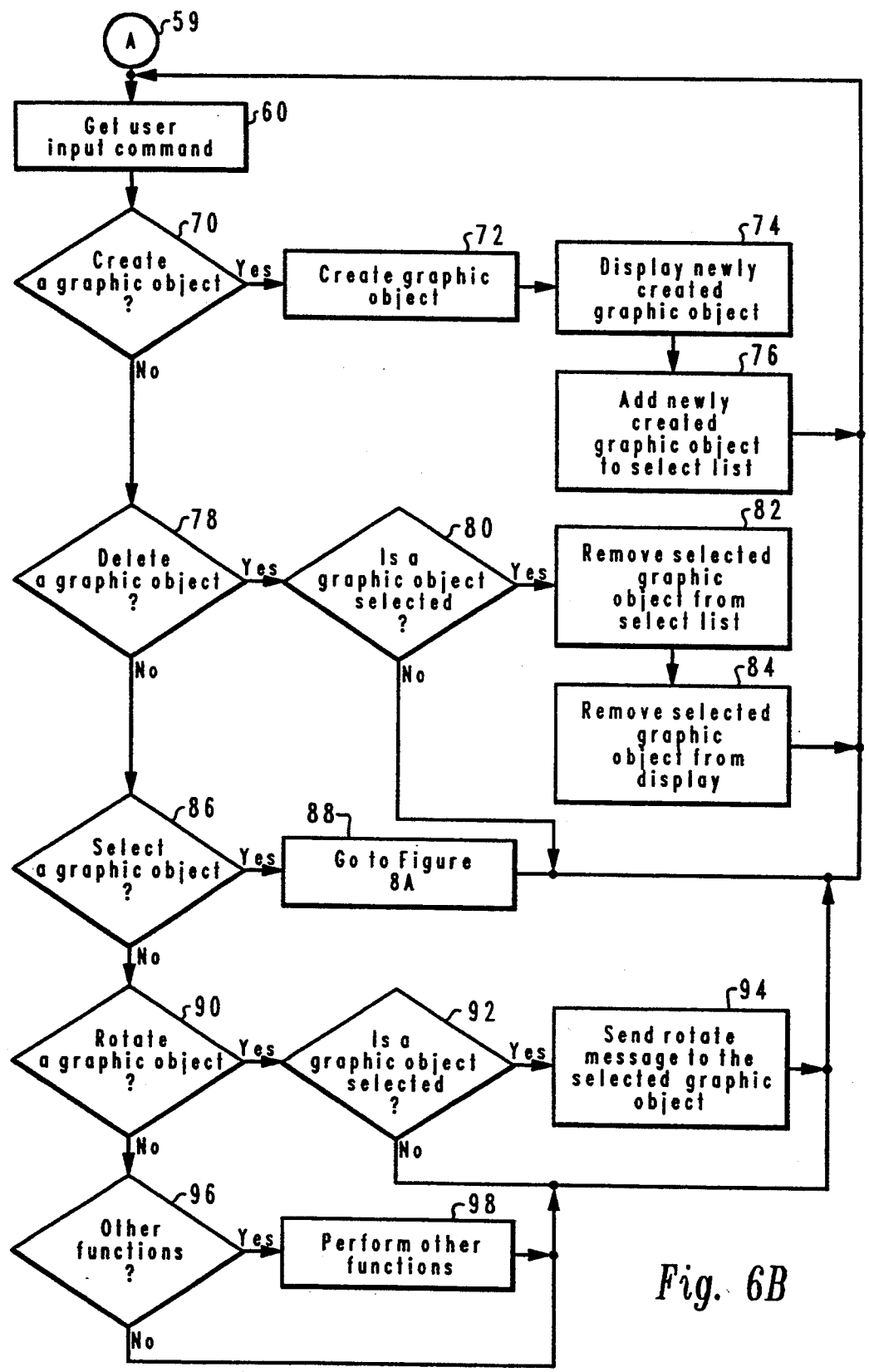

Referring now to FIGS. 6A and 6B, there is depicted a high level flow chart which illustrates the editing and creation of graphic objects in accordance with the present invention. The process starts at block 50 and thereafter passes to block 52 which depicts the creation of an empty select list. A select list is utilized to list all graphic objects within a display which may be selected by a user. Next, the process passes to block 54 which illustrates a determination of whether or not a filename was provided which contains a select list. If a determination is made that a filename was provided, the process passes to block 56 which depicts a determination of whether or not a file exists. Referring again to block 54, if a determination is made that a filename was not provided, the process passes to block 58 which illustrates the request for a filename. The process again passes to block 56.

Referring again to block 56, if a determination is made that a file does not exist, the process passes to block 60 as illustrated through block 59. Block 60 depicts the getting of a user input command. Referring again to block 56, if a determination is made that a file does exist, the process passes to block 62 which illustrates a determination of whether or not there are more graphic objects in the file. If a determination is made that there are no more graphic objects in the file, the process passes again to block 60. Referring again to block 62, if a determination is made that there are more graphic objects in the file, the process passes to block 64 which illustrates the getting of a next graphic object. Thereafter, the process passes to block 66 which illustrates the displaying of the graphic object. Next, the process passes to block 68. Block 68 depicts the addition of the graphic object to the select list. The process then passes to block 62.

After block 62 is answered negatively, the process passes from block 60 to block 70 which depicts a determination of whether or not a user has input a create command to create a graphic object. If a determination is made that a user desires to create a graphic object, the process passes to block 72 which depicts the creation of a graphic object. Next, the process passes to block 74 which illustrates the displaying of the newly created graphic object. The process then passes to block 76 which illustrates the addition of the newly created graphic object to the select list. The process then again passes to block 60.

Referring again to block 70, if a determination is made that a user does not desire to create a graphic object, the process passes to block 78 which illustrates a determination of whether or not a user desires to delete a graphic object. If a determination is made that a user desires to delete a graphic object, the process passes to block 80 which illustrates a determination of whether or not a graphic object has been selected to be deleted. If a determination is made that a graphic object has been selected, the process passes to block 82, which illustrates the removal of the selected object from the select list. Next, the process passes to block 84 which illustrates the removal of the selected graphic object from the display. Thereafter, the process passes again to block 60. Referring again to block 80, if a determination is made that a graphic object has not been selected to be deleted, the process again passes to block 60.

Figure 8A:
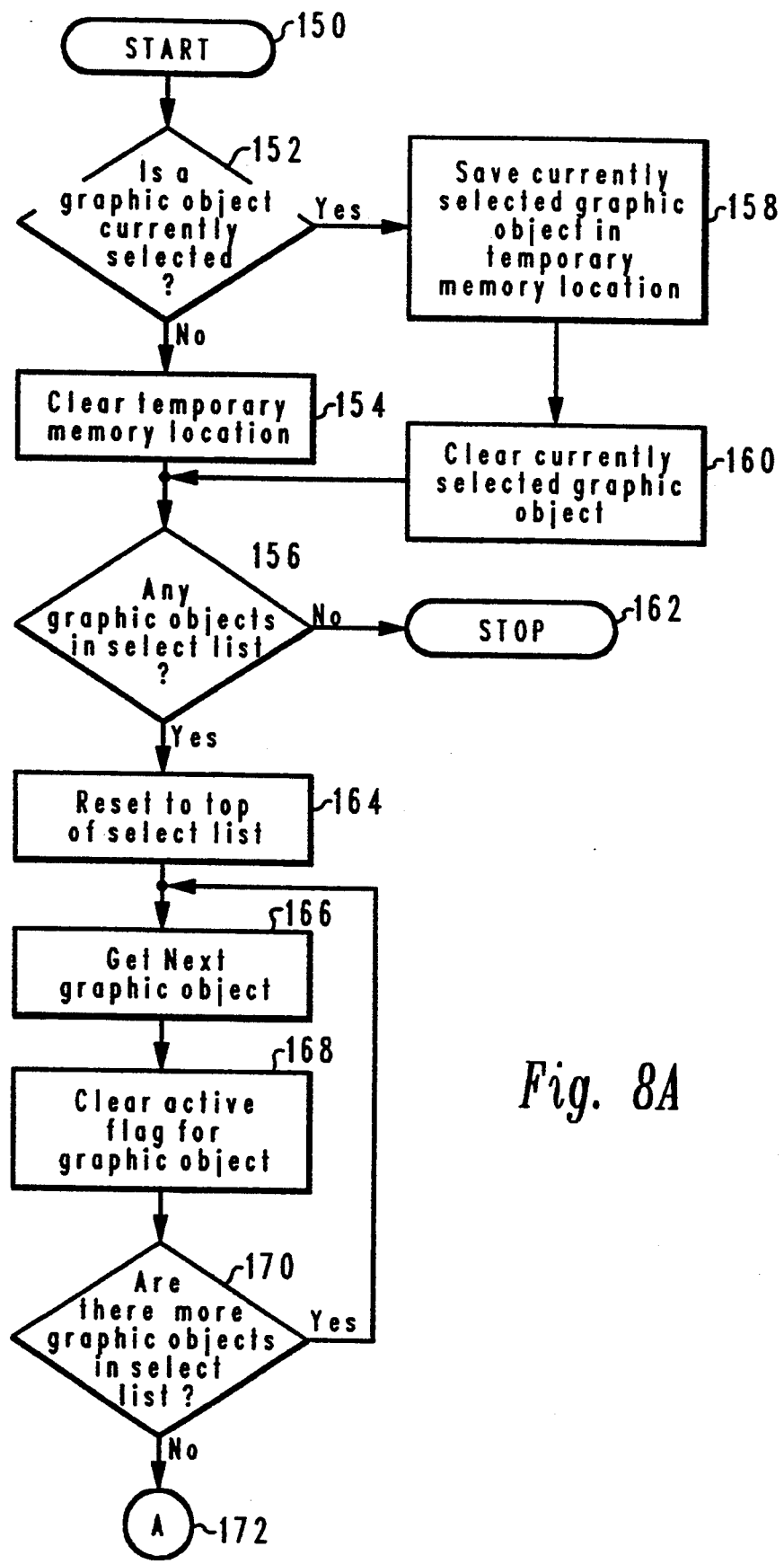
FIGS. 8A, 8B, 8C, and 8D together form a high level flow chart which depicts the selection of graphic objects in accordance with the present invention.
Figure 8B:
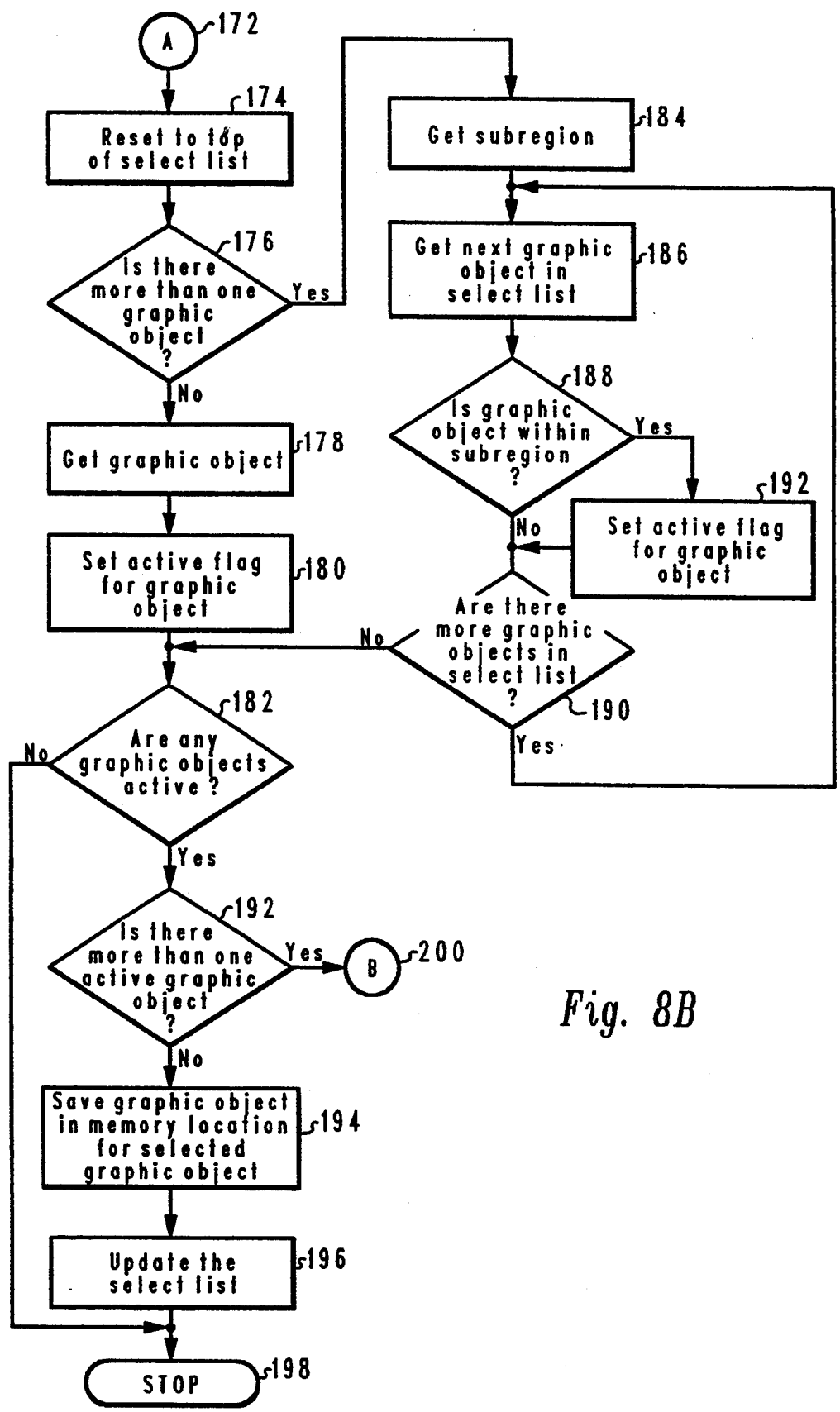
Figure 8C:
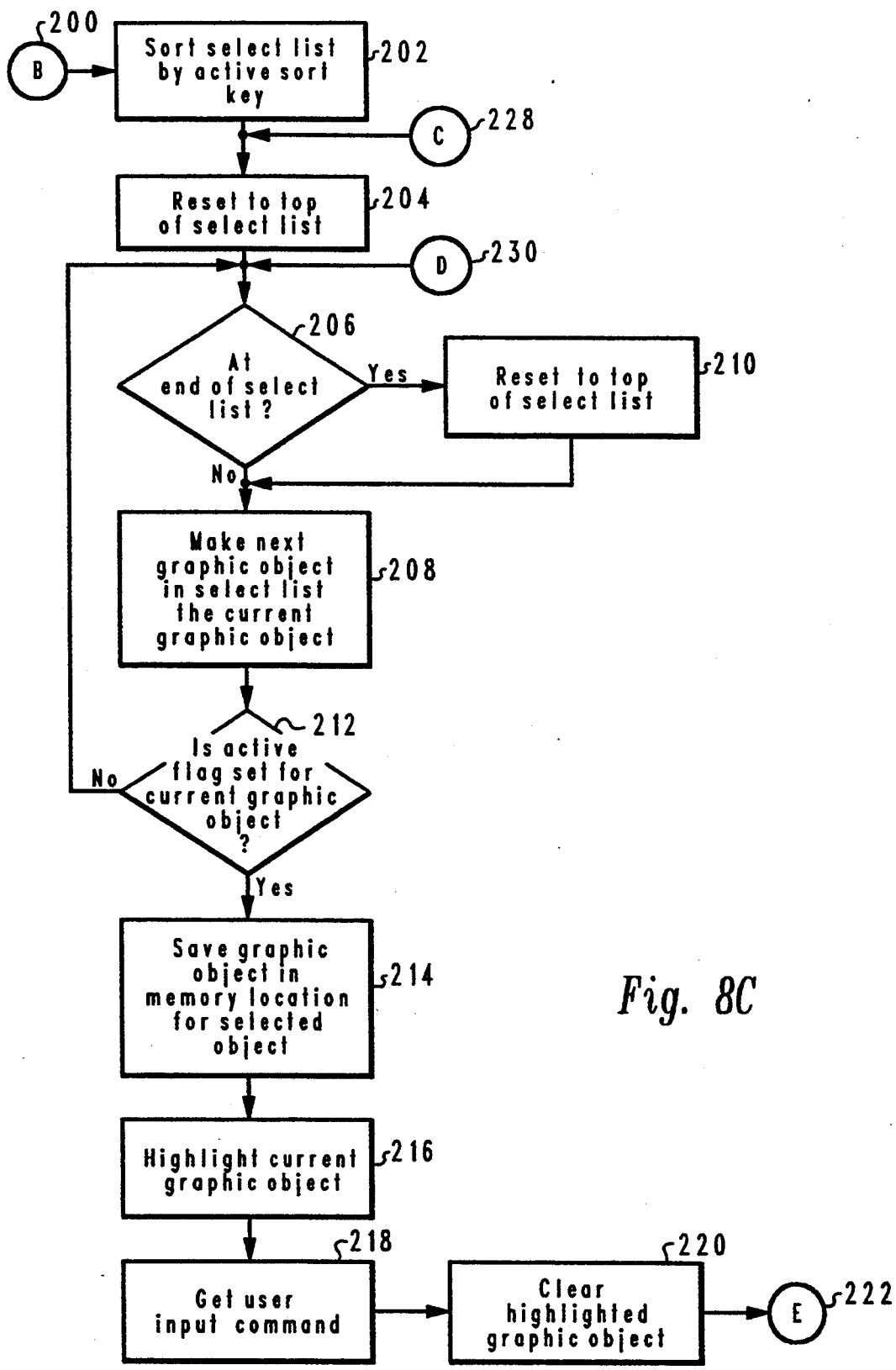
Figure 8D:
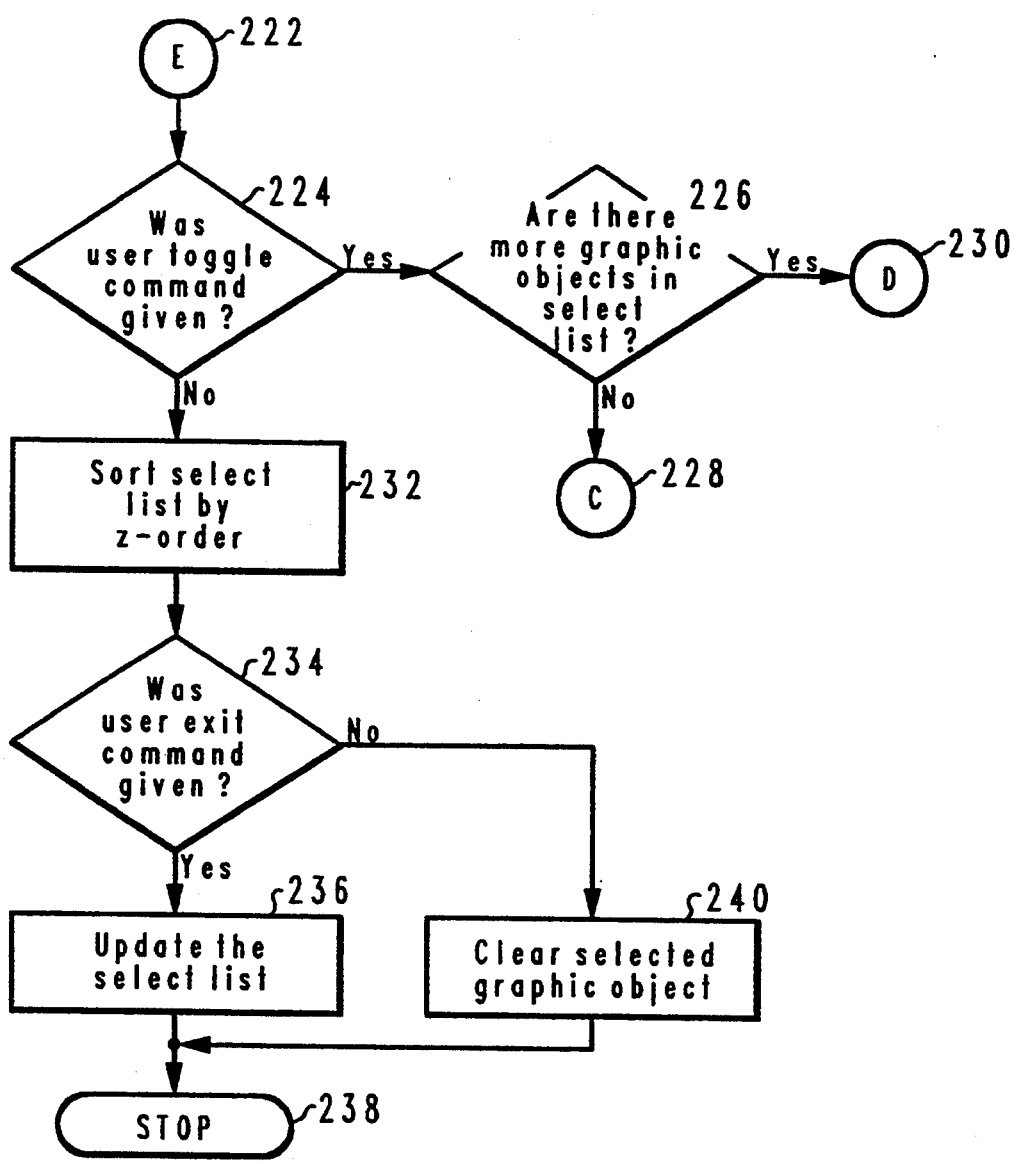

Referring again to block 78, if a determination is made that a user does not desire to delete a graphic object, the process passes to block 86 which illustrates a determination of whether or not a user desires to select a graphic object. If a determination is made that a user desires to select a graphic object, the process passes to block 88 which illustrates passing the process to the start of FIG. 8A. Thereafter, the process passes again to block 60. Referring again to block 86, if a determination is made that a user does not desire to select a graphic object, the process passes to block 90 which illustrates a determination of whether or not a user desires to rotate a graphic object. If a determination is made that a user does desire to rotate a graphic object, the process passes to block 92 which depicts a determination of whether or not a graphic object has been selected. If a determination is made that a graphic object has been selected, the process passes to block 94 which illustrates the sending of a rotate message to the selected graphic object. Thereafter, the process again passes to block 60. Referring again to block 92, if a determination is made that a graphic object has not been selected, the process passes again to block 60. Referring again to block 90, if a determination is made that a user does not desire to rotate a graphic object, the process passes to block 96 which illustrates a determination of whether or not a user desires to perform another function utilizing a graphic object. Any additional user function may be added such as the shading or filling of a graphic object. If a determination is made that a user desires to perform an additional function, the process passes to block 98 which depicts the performance of the additional function. Thereafter, the process passes again to block 60. Referring again to block 96, if a determination is made that a user does not want perform any additional function, the process passes to block 60.

Figure 7:
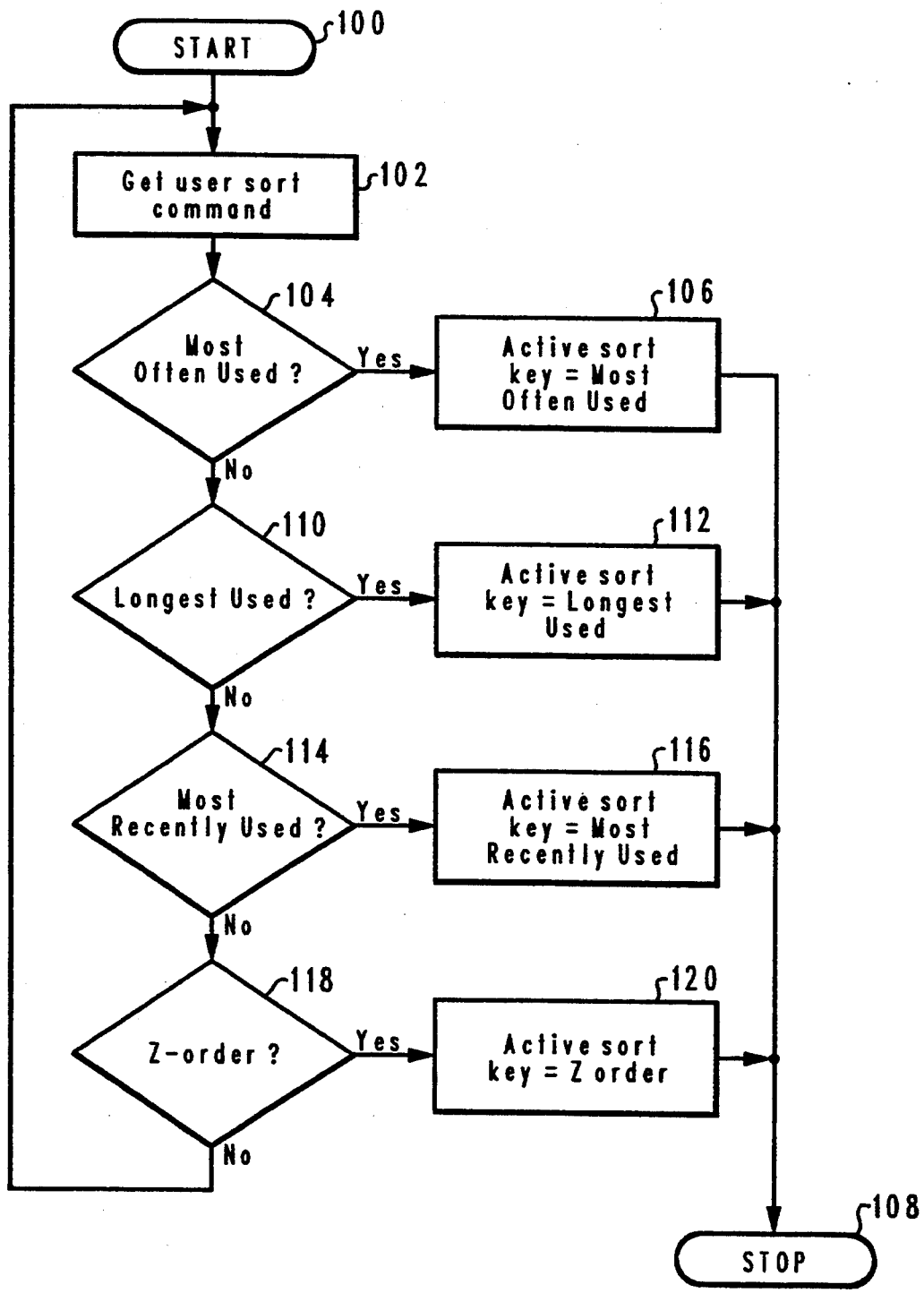
FIG. 7 is a high level flow chart which illustrates the setting of a user preference for sorting graphic objects in accordance with the present invention.

With reference now to FIG. 7, there is depicted a high level flow chart which illustrates the setting of a user preference for sorting graphic objects in accordance with the present invention. A user may predetermine the specified order in which to display each graphic object during the selection process. A user may choose to prioritize and display the graphic objects according to a determination of which graphic object is the most often used graphic object, which object is the longest used graphic object, which object is the most recently used graphic object, or the z-order for the graphic objects. The "z-order," as those skilled in the art will appreciate, is the order in which the graphic objects appear in a z-axis through the display.

The process starts at block 100 and thereafter passes to block 102 which illustrates the getting of a user sort command. Next, the process passes to block 104 which illustrates a determination of whether or not the user sort command was to sort by the most often used graphic object. If a determination is made that a user desires to sort by the most often used graphic object, the process passes to block 106 which depicts making the active sort key equal to the most often used graphic object. Thereafter, the process terminates as depicted at block 108. Referring again to block 104, if a determination is made that the user sort command was not to sort by the most often used graphic object, the process passes to block 110 which illustrates a determination of whether or not a user sort command was to sort by the longest used graphic object. If a determination is made that a user desires to sort by the longest used graphic object, the process passes to block 112 which illustrates making the active sort key equal to the longest used graphic object. The process then again terminates as depicted at block 108.

Referring again to block 110, if a determination is made that a user does not desire to sort by the longest used graphic object, the process passes to block 114 which illustrates whether or not a user sort command was to sort by the most recently used graphic object. If a determination is made that a user desires to sort by the most recently used graphic object, the process passes to block 116 which depicts making the active sort key equal to the most recently used graphic object. The process then terminates as depicted at block 108.

Referring again to block 114, if a determination is made that a user does not desire to sort by the most recently used graphic object, the process passes to block 118 which depicts a determination of whether or not a user sort command was to sort by Z-order. If a determination is made that a user desires to sort by the Z-order, the process passes to block 120 which illustrates the making of the active sort key equal to the Z-order, the process then terminates as depicted at block 108. Referring again to block 118, if a determination is made that a user does not desire to sort by Z-order, the process passes back to block 102.

Now referring to FIGS. 8A, 8B, 8C and 8D, there is illustrated a high level flow chart which depicts the selection of graphic objects in accordance with the present invention. The process starts at block 150 and thereafter passes to block 152 which illustrates a determination of whether or not a graphic object is currently selected. If a determination is made that a graphic object is not currently selected, the process passes to block 154 which depicts the clearing of a temporary memory location used for storing previously selected graphic objects. Thereafter, the process passes to block 156 which depicts a determination of whether or not any graphic objects remain in the select list. Referring again to block 152, if a determination is made that a graphic object is currently selected, the process passes to block 158 which illustrates the saving of the currently selected graphic object in the temporary memory location. Next, the process passes to block 160, which depicts the clearing of the currently selected graphic object. The process then again passes to block 156.

Referring again to block 156, if a determination is made that there are no graphic objects in a select list, the process terminates as depicted by block 162. If a determination is made that there are graphic objects in a select list, the process passes to block 164 which depicts the resetting to the top of the select list. Next the process passes to block 166 which illustrates the getting of a next graphic object. Thereafter, the process passes to block 168, which illustrates the clearing of an active flag for the graphic object. An active flag is associated with each object and indicates whether or not the associated graphic object is touching or partially within a specified subregion. The process then passes to block 170 which illustrates the determination of whether there are more graphic objects remaining in the select list. If a determination is made that there are more graphic objects in the select list the process passes to block 166. Referring again to block 170, if a determination is made that there are no more graphic objects remaining in the select list, the process passes to block 174 as illustrated through block 172.

Block 174 illustrates the resetting to the top of the select list. Thereafter, the process passes to block 176 which depicts a determination of whether or not there is more than one graphic object in the select list. If a determination is made that there is not more than one graphic object in the select list, the process passes to block 178 which depicts the getting of the graphic object. Thereafter, the process passes to block 180, which illustrates the setting of the active flag for the graphic object. The process then passes to block 182.

Referring again to block 176, if a determination is made that there is more than one graphic object, the process passes to block 184 which illustrates the getting of a specified subregion. Next the process passes to block 186 which depicts the getting of the next graphic object in the select list. Block 188 then illustrates a determination of whether or not the graphic object is within the subregion. If a determination is made that the graphic object is not within the subregion, the process passes to block 190. Referring again to block 188, if a determination is made that the graphic object is within the subregion, the process passes to block 192 which illustrates the setting of an active flag for the graphic object. The process then again passes to block 190 which illustrates a determination of whether or not there are more graphic objects in the select list. If a determination is made that there are more graphic objects in the select list, the process passes back to block 186.

Referring again to block 190, if a determination is made that there are no more graphic objects in the select list, the process passes to block 182. Block 182 illustrates a determination of whether or not there are any active graphic objects. If a determination is made that there are active graphic objects, the process passes to block 192 which depicts a determination of whether or not there is more than one active graphic object. If a determination is made that there is not more than one active graphic object, the process passes to block 194 which illustrates the saving of the graphic object in a memory location for selected graphic objects.

Next, the process passes to block 196 which depicts the updating of the select list. The select list containing the objects will be updated for the object to include the appropriate values for the number of times the object has been selected, the cumulative time an object has been selected, the timestamp of the most recent selection of the object, a number specifying location of the object relative to the other objects in the z-axis, and whether or not the object is touching or partially within the specified subregion. The process then terminates as depicted at block 198. Referring again to block 182, if a determination is made that there are no active graphic objects, the process then terminates as depicted at block 198. Referring again to block 192, if a determination is made that there is more than one active graphic object, the process passes to block 202 as depicted through block 200.

Block 202 illustrates the sorting of the select list by the active sort key. Next block 204 illustrates the resetting to the top of the select list. The process then passes to block 206 which illustrates a determination of whether or not the end of the select list has occurred. If a determination is made that the end of the select list has not occurred, the process passes to block 208 which illustrates the making of the next graphic object in the select list the current graphic object. Referring again to block 206, if a determination is made that the end of the select list has occurred, the process passes to block 210 which depicts the resetting to the top of the select list. The process then again passes to block 208.

The process then passes from block 208 to block 212, which illustrates a determination of whether or not the active flag is set for the current graphic object. If a determination is made that the active flag is not set for the current graphic object, the process passes back to block 206. Referring again to block 212, if a determination is made that the active flag is set for the current graphic object, the process passes to block 214 which illustrates the saving of the graphic object in a memory location utilized for saving selected graphic objects. The process then passes to block 216 which illustrates the highlighting of the current graphic object. Thereafter, the process passes to block 218, which depicts the getting of a user input command. Next the process passes to block 220 which illustrates the clearing of the highlighted graphic object. The process then passes to block 224 as illustrated through block 222.

Block 224 illustrates a determination of whether or not a user toggle command was given. If a determination is made that a user toggle command was given, the process passes to block 226 which depicts a determination of whether or not there are more graphic objects in the select list. If a determination is made that there are no more graphic objects in the select list, the process passes back to block 204 as illustrated through block 228. Referring again to block 226, if a determination is made that there are more graphic objects in the select list, the process passes back to block 206 as illustrated through block 230.

Referring again to block 224, if a determination is made that a user toggle command was not given, the process passes to block 232, which illustrates the sorting of the select list by Z-order. Next the process passes to block 234 which illustrates a determination of whether or not a user exit command was given. If a determination is made that a user exit command was given, the process passes to block 236 which illustrates the updating of the select list. The process then terminates as depicted at block 238. Referring again to block 234, if a determination is made that a user exit command was not given, the process passes to block 240 which illustrates the clearing of the selected graphic object. The process then terminates as illustrated at block 238.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system having a display and a plurality of overlapping graphic objects displayed therein, said method comprising the data processing implemented steps of:

graphically specifying a subregion within said display wherein said subregion consists of a variably sized user-selected portion of said display;

determining a set of said plurality of overlapping graphic objects which are displayed at least partially within said specified subregion; and thereafter, temporarily altering a specified order of only said determined set of said plurality of overlapping graphic objects, in response to a subsequent user input to said data processing system.

2. The method in a data processing system having a display and a plurality of overlapping graphic objects displayed therein according to claim 1 wherein at least one of said set of said plurality of overlapping graphic objects is completely hidden from view by said plurality of overlapping graphic objects prior to temporarily altering said specified order.

3. The method in a data processing system having a display and a plurality of overlapping graphic objects displayed therein according to claim 1 further comprising the step of displaying each of said set of said plurality of overlapping graphic objects in said altered specified order on said display, whereby a user may select one of said each of said set of said plurality of overlapping graphic objects.

4. The method in a data processing system having a display and a plurality of overlapping graphic objects displayed therein according to claim 3 further comprising the step of restoring said set of said plurality of overlapping graphic objects to said specified order in response to a user input to said data processing system.

5. The method in a data processing system having a display and a plurality of overlapping graphic objects displayed therein according to claim 1 wherein said step of temporarily altering a specified order of said set of said plurality of overlapping graphic objects, in response to a subsequent user input to said data processing system further comprises the step of temporarily altering a specified order of said set of said plurality of overlapping graphic objects in accordance with a frequency of use of each of said plurality of graphic objects, in response to a subsequent user input to said data processing system.

6. The method in a data processing system having a display and a plurality of overlapping graphic objects displayed therein according to claim 1 wherein said step of temporarily altering a specified order of said set of said plurality of overlapping graphic objects, in response to a subsequent user input to said data processing system further comprises the step of temporarily altering a specified order of said set of said plurality of overlapping graphic objects in accordance with a length of time of use of each of said plurality of graphic objects, in response to a subsequent user input to said data processing system.

7. The method in a data processing system having a display and a plurality of overlapping graphic objects displayed therein according to claim 1 wherein said step of temporarily altering a specified order of said set of said plurality of overlapping graphic objects, in response to a subsequent user input to said data processing system further comprises the step of temporarily altering a specified order of said set of said plurality of overlapping graphic objects in accordance with a time of use of each of said plurality of graphic objects, in response to a subsequent user input to said data processing system.

8. A data processing system having a display and a plurality of overlapping graphic objects displayed therein, comprising:

means for graphically specifying a subregion within said display wherein said subregion consists of a variably sized user-selected portion of said display;

means for determining a set of said plurality of overlapping graphic objects which are displayed at least partially within said specified subregion; and means for thereafter, temporarily altering a specified order of only said determined set of said plurality of overlapping graphic objects, in response to a subsequent user input to said data processing system.

9. The data processing system having a display and a plurality of overlapping graphic objects displayed therein according to claim 8 wherein at least one of said set of said plurality of overlapping graphic objects is completely hidden from view by said plurality of overlapping graphic objects prior to temporarily altering said specified order.

10. The data processing system having a display and a plurality of overlapping graphic objects displayed therein according to claim 8 further comprising means for displaying each of said set of said plurality of overlapping graphic objects in said altered specified order on said display, whereby a user may select one of said each of said set of said plurality of overlapping graphic objects.

11. The data processing system having a display and a plurality of overlapping graphic objects displayed therein according to claim 10 further comprising means for restoring said set of said plurality of overlapping graphic objects to said specified order in response to a user input to said data processing system.

12. The data processing system having a display and a plurality of overlapping graphic objects displayed therein according to claim 8 wherein said means for temporarily altering a specified order of said set of said plurality of overlapping graphic objects, in response to a subsequent user input to said data processing system further comprises means for temporarily altering a specified order of said set of said plurality of overlapping graphic objects in accordance with a frequency of use of each of said plurality of graphic objects, in response to a subsequent user input to said data processing system.

13. The data processing system having a display and a plurality of overlapping graphic objects displayed therein according to claim 8 wherein said means for temporarily altering a specified order of said set of said plurality of overlapping graphic objects, in response to a subsequent user input to said data processing system further comprises means for temporarily altering a specified order of said set of said plurality of overlapping graphic objects in accordance with a length of time of use of each of said plurality of graphic objects, in response to a subsequent user input to said data processing system.

14. The data processing system having a display and a plurality of overlapping graphic objects displayed therein according to claim 8 wherein said means for temporarily altering a specified order of said set of said plurality of overlapping graphic objects, in response to a subsequent user input to said data processing system further comprises means for temporarily altering a specified order of said set of said plurality of overlapping graphic objects in accordance with a time of use of each of said plurality of graphic objects, in response to a subsequent user input to said data processing system.

* * * * *